US007359703B2

(12) United States Patent
McGuffin et al.

(10) Patent No.: US 7,359,703 B2
(45) Date of Patent: Apr. 15, 2008

(54) ADAPTIVE COMMUNICATIONS SYSTEM AND METHOD

(75) Inventors: Thomas F. McGuffin, Seattle, WA (US); Willard R. True, Kirkland, WA (US); Michael D. Holder, Redmond, WA (US); Mark C. Erwin, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 141 days.

(21) Appl. No.: 10/906,218

(22) Filed: Feb. 9, 2005

(65) Prior Publication Data

US 2006/0178141 A1    Aug. 10, 2006

(51) Int. Cl.
*H04Q 7/20* (2006.01)
(52) U.S. Cl. ............... 455/431; 455/404.2; 455/414.1; 455/414.2; 455/432.1; 455/435.2; 455/436; 455/437; 455/438; 455/439; 455/440; 455/441; 455/442; 343/705; 701/120; 701/213; 701/220
(58) Field of Classification Search ............ 455/404.2, 455/414.1–414.2, 524, 431, 432.1, 431.2, 455/436–444, 456.1–457; 343/705; 701/120, 701/220, 213
See application file for complete search history.

(56) References Cited

U.S. PATENT DOCUMENTS

| 5,123,112 A * | 6/1992 | Choate .................. 455/524 |
| 5,212,804 A * | 5/1993 | Choate .................. 455/431 |
| 5,867,804 A * | 2/1999 | Pilley et al. ............. 701/120 |
| 5,920,807 A | 7/1999 | Lemme |
| 6,047,165 A | 4/2000 | Wright et al. |
| 6,154,637 A | 11/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,181,990 B1 | 1/2001 | Grabowsky et al. |
| 6,308,045 B1 | 10/2001 | Wright et al. |
| 6,311,060 B1 | 10/2001 | Evans et al. |
| 6,363,248 B1 | 3/2002 | Silverman |
| 6,405,975 B1 * | 6/2002 | Sankrithi et al. ......... 244/1 R |
| 6,507,739 B1 * | 1/2003 | Gross et al. ............. 455/431 |
| 6,714,783 B1 | 3/2004 | Simonin et al. |
| 6,816,728 B2 | 11/2004 | Igloi et al. |
| 6,831,610 B2 * | 12/2004 | Quagliaro ............... 343/705 |

* cited by examiner

*Primary Examiner*—Steve M. D'Agosta
(74) *Attorney, Agent, or Firm*—Fogg & Powers LLC

(57) ABSTRACT

System and method for the adaptive control of VHF communications in aircraft. In one embodiment, the invention includes an adaptive communications system for an aircraft having a communications processor that accesses a communications switching model to select a preferred ground communications station. In another embodiment, a method of communication between an aircraft and a ground station includes receiving a communications switching model and determining a flight parameter for the aircraft as the aircraft navigates along a flight route and selecting a ground station based upon the determined flight parameter. The aircraft then communicates with the selected ground station. In still another embodiment, a method for compiling a communications switching model includes receiving signals from a ground station and measuring a signal strength. A preferred ground station is selected based upon the measured signal strength value.

34 Claims, 5 Drawing Sheets

| ELAPSED TIME | GROUND STATION | SIGNAL STRENGTH | POSITION | ALTITUDE |
|---|---|---|---|---|
| 0:00:00 | 32 | 7 | 47.53N 122.30W | 0 |
| 0:05:00 | 32 | 6 | 46.50N 120.17W | 8,000 |
|  | 34 | 2 |  |  |
| 0:10:00 | 32 | 4 | 46.20N 119.80W | 8,000 |
|  | 34 | 4 |  |  |
| 0:15:00 | 32 | 2 | 45.80N 118.92W | 10,000 |
|  | 34 | 8 |  |  |
| 0:20:00 | 32 | 1 | 45.72N 117.40W | 10,000 |
|  | 34 | 9 |  |  |
| 0:25:00 | 34 | 0 | 45.70N 116.27W | 12,000 |
|  | 44 | 3 |  |  |
| 0:30:00 | 44 | 3 | 46.02N 115.71W | 18,000 |
|  | 42 | 1 |  |  |
| 0:35:00 | 44 | 7 | 46.30N 115.02W | FL 210 |
|  | 42 | 5 |  |  |
| 0:40:00 | 44 | 5 | 46.50N 114.8W | FL 250 |
|  | 42 | 5 |  |  |
| 0:45:00 | 44 | 4 | 47.50N 113.47W | FL 330 |
|  | 42 | 7 |  |  |
| ⋮ | ⋮ | ⋮ | ⋮ | ⋮ |

| ELAPSED TIME | GROUND STATION | SIGNAL STRENGTH | POSITION | ALTITUDE |
|---|---|---|---|---|
| 0:00:00 | 32 | 7 | 47.53N 122.30W | 0 |
| 0:05:00 | 32<br>34 | 6<br>2 | 46.50N 120.17W | 8,000 |
| 0:10:00 | 32<br>34 | 4<br>4 | 46.20N 119.80W | 8,000 |
| 0:15:00 | 32<br>34 | 2<br>8 | 45.80N 118.92W | 10,000 |
| 0:20:00 | 32<br>34 | 1<br>9 | 45.72N 117.40W | 10,000 |
| 0:25:00 | 34<br>44 | 0<br>3 | 45.70N 116.27W | 12,000 |
| 0:30:00 | 44<br>42 | 3<br>1 | 46.02N 115.71W | 18,000 |
| 0:35:00 | 44<br>42 | 7<br>5 | 46.30N 115.02W | FL 210 |
| 0:40:00 | 44<br>42 | 5<br>5 | 46.50N 114.8W | FL 250 |
| 0:45:00 | 44<br>42 | 4<br>7 | 47.50N 113.47W | FL 330 |
| ⋮ | ⋮ | ⋮ | ⋮ | ⋮ |

*FIG. 4*

| POSITION | ALTITUDE | GROUND STATION |
|---|---|---|
| 47.53N 122.30W | 0 | 32 |
| 46.50N 120.17W | 8,000 | 32 |
| 46.20N 119.80W | 8,000 | 32 |
| 46.10N 119.40W | 9,000 | 34 |
| 45.80N 118.92W | 10,000 | 34, 44 |
| 45.72N 117.40W | 10,000 | 34, 44 |
| 45.70N 116.81W | 11,000 | 34, 44 |
| 45.70N 116.27W | 12,000 | 44 |
| 46.02N 115.71W | 18,000 | 42, 44 |
| 46.30N 115.02W | FL 210 | 42, 44 |
| 46.50N 114.8W | FL 250 | 42, 44 |
| 46.50N 113.47W | FL 330 | 42, 44 |
| ⋮ | ⋮ | ⋮ |

*FIG. 6*

ADAPTIVE COMMUNICATIONS SYSTEM AND METHOD

BACKGROUND OF THE INVENTION

Information is typically communicated between a ground station and an aircraft using a VHF communications apparatus that operates in a frequency band allocated to aircraft operation. For example, voice communications between aircraft and ground-based air traffic control facilities are generally carried out by means of a VHF communications transceiver that employs amplitude modulation (AM) and operates in a frequency band from 118.0 MHz to 135.95 MHz on any of a plurality of selectable and discrete channel frequencies in this band. Data may also be communicated between a ground station and an aircraft by coupling a modem to the VHF communications transceiver so that data may be communicated by modulating a radio frequency carrier with audio frequency tones. Alternately, phase shift keying, or other known modulation methods may be used to transmit data on current VHF data networks. For example, data may be transferred between the ground station and an aircraft using the well known Aircraft Communications Addressing and Reporting System (ACARS). Alternately, the Aeronautical Telecommunication Network (ATN) may be used, which provides a datalink capability so that bit-oriented communication may occur between the air traffic controller and the aircraft.

Since radio communications at VHF frequencies is generally limited to line of sight propagation, communications between the ground station and the aircraft are generally not possible after the aircraft has flown beyond the horizon. If intervening geographical obstructions, such as a mountain range, are present between the ground station and the aircraft, communications may not be possible even though the aircraft has not yet flown beyond the horizon. In order to maintain continuous communications between a ground station and an aircraft, a plurality of intervening ground stations are generally required to relay signals between the station originating the communications and the aircraft as it proceeds along a given flight route. Accordingly, in a circuit-switched radio system, a connection is created between the originating ground station and the aircraft through one or more relay stations by dedicating a predetermined amount of transmission capacity to the connection. Alternately, in a packet-switched system (such as ACARS), a connection is created between the originating station and the aircraft by transmitting data in packets having address and control data encoded on discrete portions of the communication. As a result, several connections may use the same transmission path simultaneously, since the path is dedicated to a single connection only for the packet transmission.

In either case, a route from the ground station to the aircraft must be selected and enabled. Signal routing may be based upon prior calculation, or upon operational experience obtained from aircraft that regularly navigate along a selected route. Thus, "hand-over" points, which are locations where the aircraft ceases communicating with one ground station, and initiates communications with another, may be determined by analysis, or may be empirically determined. In another known method, an aircraft that is navigating along a selected route may continuously monitor the absolute signal strength of a plurality of ground stations within radio range of the aircraft, and selectively communicate with the ground station having the highest signal strength. A hand-over then occurs when the signal strength of the selected station diminishes relative to the signal strength of another ground station along the route.

Although the foregoing methods constitute acceptable methods for effecting the hand-over, various drawbacks nevertheless exist. In systems where the hand-over points have been analytically or empirically determined, the aircraft is constrained to navigate along the routes for which hand-over data has been previously compiled, and to communicate with the pre-selected ground stations. Such systems may not provide seamless and reliable communications for an aircraft since variations in signal strength may be present that do not arise from terrain obstructions. For example, variations in signal strength may arise due to changes in the radiated power from the ground stations. In systems that rely on the simultaneous measurement of absolute signal strengths from a plurality of ground stations, variations in signal strength may also occur that complicate the selection of a ground station. For example, more than one ground station may present relatively equal signal strengths to the communications system on the aircraft, so that the ground stations compete for the handover. In other cases, terrain obstructions may abruptly interrupt an established communications path, so that seamless and reliable communications for an aircraft are interrupted.

What is needed is a communications system that avoids the shortcoming inherent in the prior art.

SUMMARY OF THE INVENTION

Embodiments of the present invention include systems and methods for the adaptive control of VHF communications in aircraft. In one aspect, an adaptive communications system for an aircraft includes a communications processor coupled to an aircraft communications system that accesses a communications switching model. The model includes a flight position and a flight altitude of the aircraft that selects a preferred ground communications station based upon a position and an altitude of the aircraft. The system is further configured to acquire communications data including a flight position, a flight altitude and a signal strength. A memory system is coupled to the communications processor that is configured to store the communications switching model and the communications data, wherein the communications data is selectively processed by the processor to revise the communications switching model.

BRIEF DESCRIPTION OF THE DRAWINGS

The preferred and alternative embodiments of the present invention are described in detail below with reference to the following drawings.

FIG. 4 is a table that shows a data record compiled by a suitably configured aircraft while navigating along a predetermined flight route, in accordance with the method of communications of FIG. 3;

FIG. 6 is a table that shows a portion of a communications switching model generated by the system of FIG. 5.

DETAILED DESCRIPTION OF THE PREFERRED EMBODIMENT

Embodiments of the present invention include systems and methods for the adaptive control of VHF communications in aircraft. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
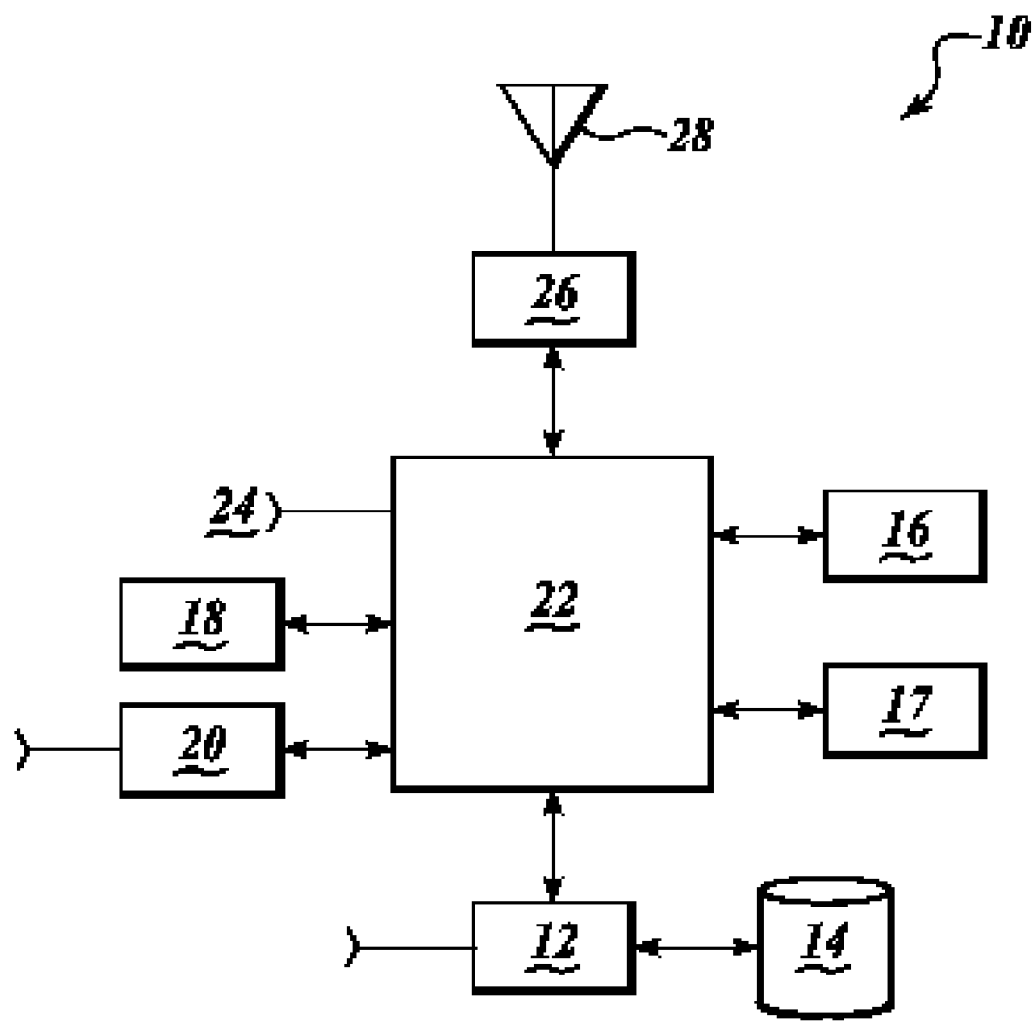
FIG. 1 is a block diagrammatic view of an adaptive communications system for an aircraft, according to an embodiment of the invention.

FIG. 1 is a block diagrammatic view of an adaptive communications system 10 for an aircraft, according to an embodiment of the invention. The system 10 includes a communications processor 12 that is configured to receive a communications switching model, and store the communications switching model in a database 14 that is operatively coupled to the communications processor 12. Briefly, and in general terms, the communications switching model permits the processor 12 to conveniently and reliably determine communications hand-over points. The communications switching model will be described in further detail below. The communications processor 12 is operatively coupled to a communication management unit (CMU) 22.

The CMU 22 is also coupled to a plurality of peripheral devices that cooperatively assist the CMU 22 in the performance of a variety of tasks. For example, the CMU 22 is coupled to a position-sensing device 17 that is operable to continuously indicate the position of the aircraft as it proceeds along a flight route. Accordingly, the position-sensing device 17 may be a global positioning system (GPS) receiver, an inertial navigation system (INS) installed in the aircraft, or other position-sensing device. The CMU 22 may also be coupled to a flight management computer system (FMCS) 16. At least one Multiple Control Display Unit (MCDU) 18 is coupled to the CMU 22 that provides an alphanumeric keyboard that allows a flight crew member to communicate selected commands to the CMU 22, and a display screen to view selected information generated by the CMU 22. A database loader 20 is also coupled to the CMU 22 and is generally configured to permit ground personnel to provide updated information to the CMU 22, such as updated software. Additionally, the database loader 20 may also be used to provide updated information to the communications switching model. The CMU 22 is selectively coupled to a plurality of communications devices. For example, the communications devices may include a high frequency (HF) radio communications system, a satellite communications (SATCOM) system, or other communications systems such as a VHF radio communications system 26 that is further coupled to an antenna 28. The VHF antenna 28 is typically positioned on an exterior portion of the aircraft. The VHF radio communications system 26 may include a modem that permits digital information to be communicated between the VHF system 26 and the CMU 22. Alternately, the modem may be positioned within the CMU 22.

Figure 2:
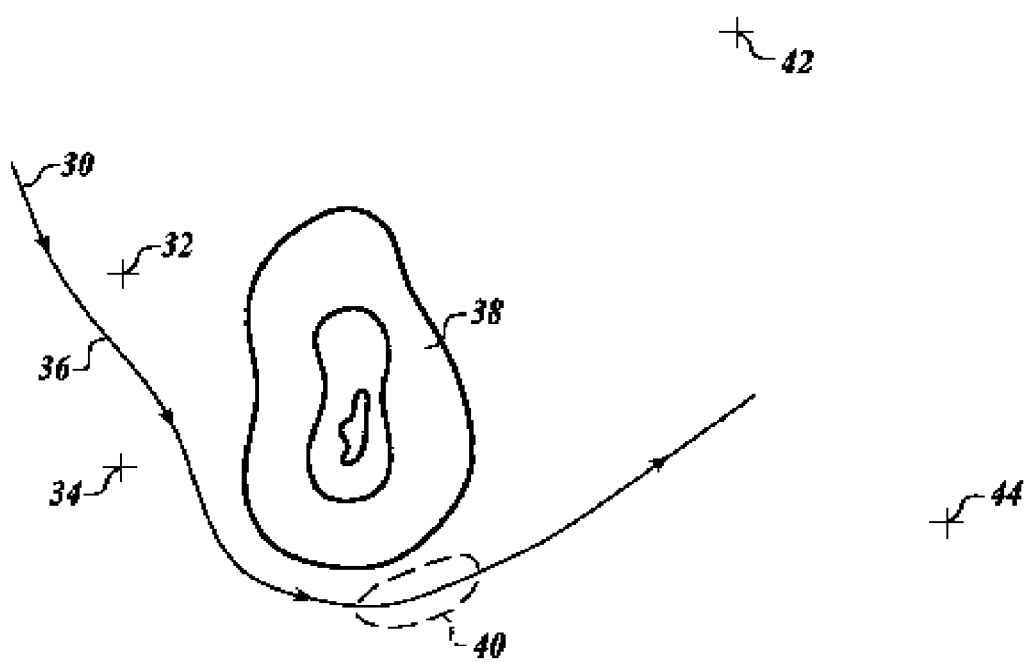
FIG. 2 is a plan view of a geographical area having a plurality of spaced-apart ground stations that is used to describe the operation of a conventional method of communication between an aircraft and a ground station.

FIG. 2 is a plan view of a geographical area having a plurality of spaced-apart ground stations, which will be used to describe the operation of a conventional method of communication between an aircraft and a ground station. An aircraft navigating along a flight route 30 communicates with a ground station 32 or a ground station 34 on a common frequency. When the aircraft is proximate to one of the ground stations 32 and 34, the aircraft preferentially communicates with the ground station having the highest absolute signal strength. At a flight position 36 along the flight route 30, however, the aircraft may be equidistant from the ground station 32 and the ground station 34 so that approximately equal signal strengths are sensed by the aircraft. Accordingly, the ground stations 32 and 34 may compete to maintain continuous communications with the aircraft. At other flight positions along the flight route 30, a terrain obstacle, such as a mountain range 38, may interfere with line of sight propagation of radio signals between the aircraft and a selected ground station. For example, when the aircraft enters a region 40, line of sight propagation of signals between the aircraft and the ground stations 32 and 34 are substantially reduced, and may be abruptly interrupted. As a consequence, as the aircraft continues along the flight route 30, the aircraft must initiate communications with the ground stations 42 and/or 44, which may be positioned at a considerable distance relative to the aircraft. Since the aircraft rapidly moves from a flight position having relatively favorable line of sight propagation of signals prior to entering the region 40, to a flight position where signal strengths are significantly reduced (within and even beyond the region 40), it is often difficult to consistently and seamlessly provide radio communications between the aircraft and a ground station.

Figure 3:
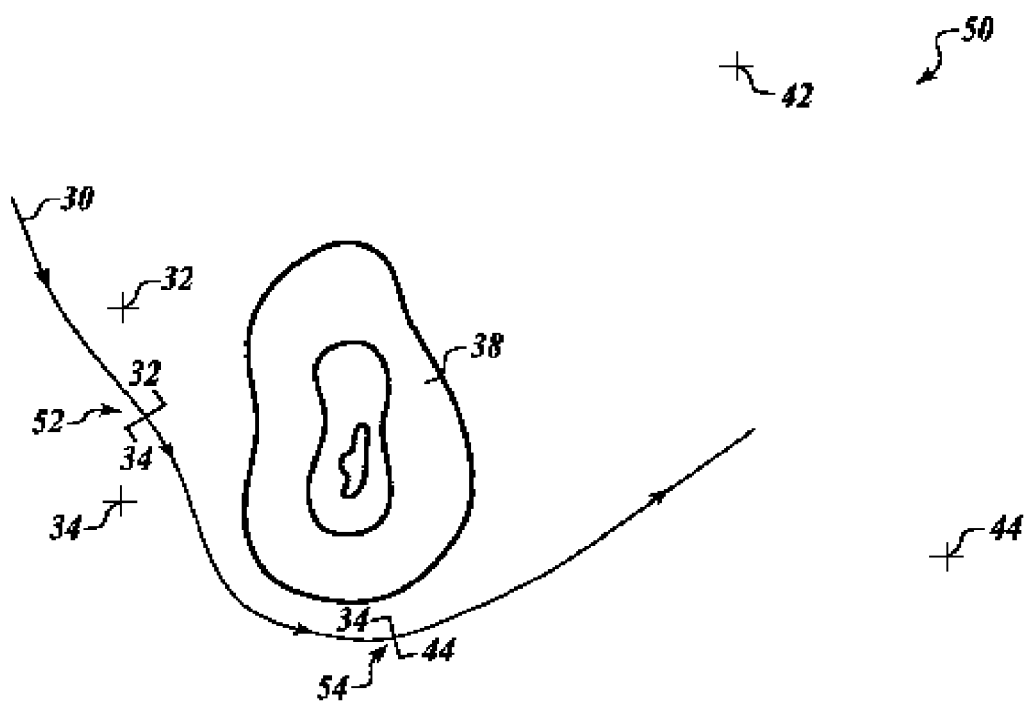
FIG. 3 is a plan view of a geographical area having a plurality of spaced-apart ground stations that is used to describe a method of communications between an aircraft and a ground station according to another embodiment of the invention.

FIG. 3 is a plan view of a geographical area 50 having a plurality of spaced-apart ground stations, which will be used to describe a method of communications between an aircraft and a ground station according to an embodiment of the invention. With reference also to FIG. 1, an aircraft continuously determines the position of the aircraft by accessing the position-sensing device 17. Additionally, the aircraft accesses a communications switching model that is stored in the database 14. The communications switching model includes information that indicates which ground stations are expected to be available and addressed based upon the current position and altitude of the aircraft and prior experience. When the aircraft approaches the region 40 (FIG. 2), the communications switching model instructs the processor 12 that the aircraft should discontinue communications with the ground station 34, and to initiate communications with the ground station 44. Accordingly, since the processor 12 is able to change ground stations based upon the geographical position and altitude of the aircraft, as embodied in the communications switching model, the aircraft may advantageously, seamlessly and continuously communicate with the ground stations as the aircraft navigates along the route 30. As the aircraft navigates along the route 30, absolute signal strengths from the ground stations along the route 30, as well as the altitude of the aircraft are also transferred to the processor 12 and stored in the database 14, so that the communications switching model may be updated, as will be described in greater detail below.

With continued reference to FIG. 1 and FIG. 3, a method for compiling a communications switching model includes recording absolute signal strengths at regular time intervals as the flight progresses. Alternately, they may be recorded at non-regular intervals. In either case, a flight position corresponding to the signal strength reading is also recorded in the database 14. The corresponding flight position is obtained from the position-sensing device 17, which may include an inertial guidance system (INS) associated with the FMCS 16, or alternately from a Ground Positioning System (GPS) receiver operably coupled to the FMCS 16. An altitude of the aircraft corresponding to the signal strength reading may also be obtained from a pitot-static system, or air data computer operably positioned on the aircraft (not shown in FIG. 1) and in communication with the FMCS 16. The altitude is also recorded in the database 14. Accordingly, as the aircraft proceeds along the route 30, signal strength readings and corresponding position and altitude values are stored in the database 14.

The CMU 22 (FIG. 1) and communication switching model may use the information stored in the database 14 to better determine the hand-over positions 52 and 54 along the route 30 in order to maximize ground station connectivity. The hand-over position 52 corresponds to a flight position where the absolute signal strength of ground station 32 is at least incrementally lower than the absolute signal strength of the ground station 34, which may be quantified by a predetermined value. For example, when the aircraft is positioned to receive a signal from the ground station 32 that is about 3 dB lower than a signal received from the ground station 34, the aircraft position at that point on the route 30 corresponds to the hand-over point 52. The signal hand-over position may also be identified by determining signal strength gradients from ground stations as the aircraft navigates along the route 30. For example, when the aircraft is positioned between the ground stations 34 and 44, the aircraft is moving away from the ground station 34, and is moving towards the ground station 44. Accordingly, the signal strength of the station 34 is decreasing at a measurable first rate, while the signal strength of the station 44 is increasing at a measurable second rate. The hand-over point 54 may therefore be determined by comparing signal strength gradients from the ground stations 34 and 44. This aspect is particularly advantageous because, as noted above, the signal strength of the station 34 may rapidly decrease as the aircraft navigates around the mountain range 38. The hand-over points 52 and 54 may also be determined by any combination of signal strength values and signal strength gradients corresponding to the ground stations.

FIG. 4 is an exemplary table that shows a data record 60 compiled by a suitably configured aircraft while navigating along the predetermined flight route 30 of FIG. 3, in accordance with the method of communications 50 of FIG. 3. At discrete time intervals as the aircraft proceeds along the flight route, the signal strength of all ground stations are recorded, along with the position of the aircraft and the aircraft altitude. For example, while the aircraft is on the ground prior to departure, the aircraft may communicate with the ground station 32, which has an absolute signal strength of 7 relative to a maximum signal strength of 10. Other signal level criteria may also be employed, where the signal level is expressed as a decibel level below a known reference level. As described above, the aircraft position may be determined from an inertial navigation system, a GPS system, or other known positioning systems. After the aircraft departs, the aircraft is able to receive signals from more than a single ground station, so that absolute signal strength values may be acquired from the ground stations. For example, as the aircraft approaches the region 40 of FIG. 2 at an elapsed flight time of 0:20:00, the absolute signal strengths are 1 and 9 from the ground stations 32 and 34, respectively. As the aircraft navigates into the region 40, however, the signal strength of the ground station 34 abruptly decreases to zero at 0:25:00, while also moving into radio reception range of the ground stations 42 and 44 at 0:30:00. As the aircraft proceeds along the route 30, other signal strength values may be acquired along with corresponding altitude and position data. The data record 60 may be downloaded from the aircraft at the conclusion of the flight and processed with other similar data acquired from other similarly configured aircraft, as will be described in greater detail below.

Figure 5:
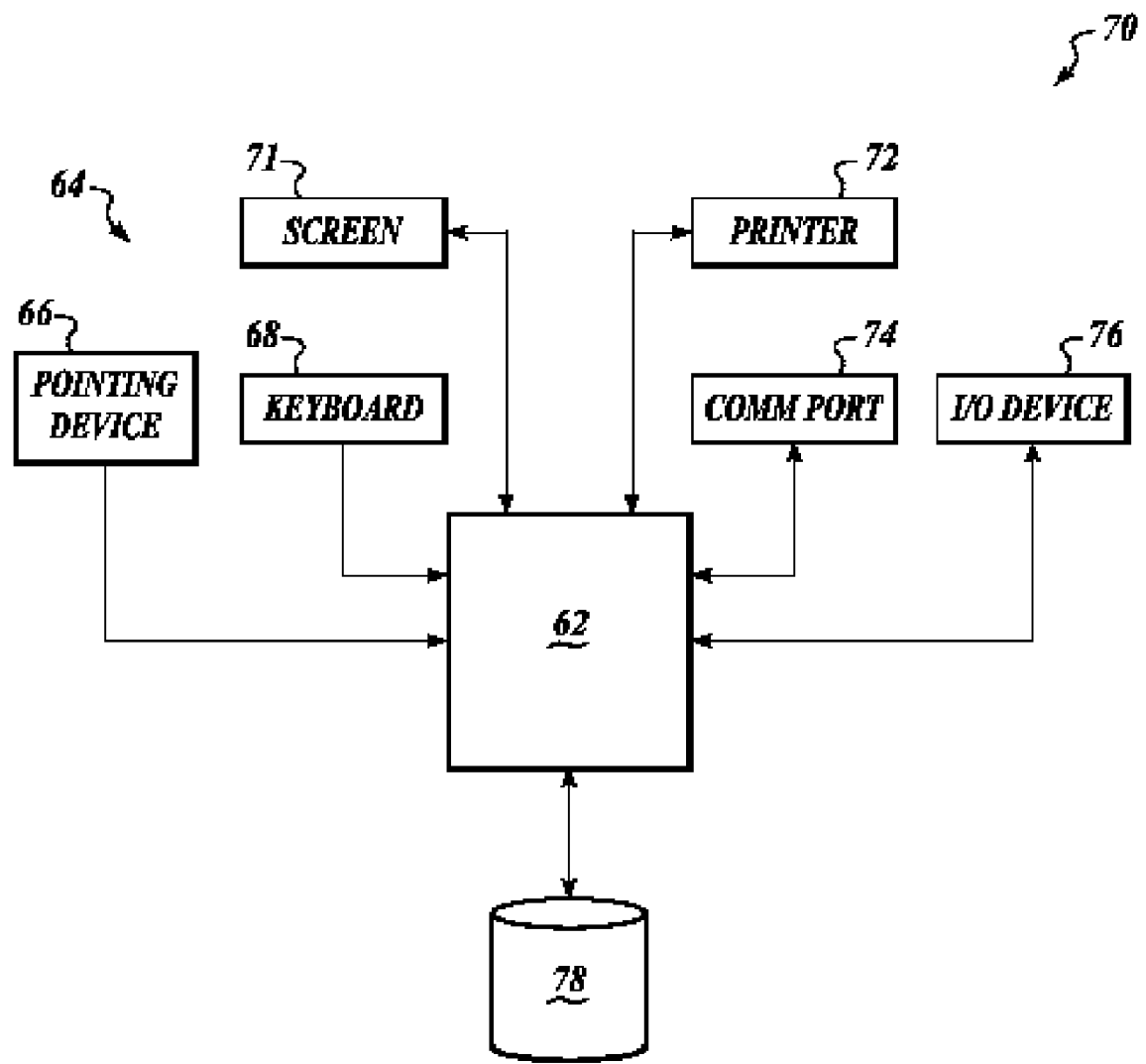
FIG. 5 is a block view of a system for processing one or more data records according to still another embodiment of the invention.

FIG. 5 is a block view of a system 70 for processing one or more data records 60 according to still another embodiment of the invention. The system 70 includes a processor 62, which generally includes any programmable electronic device configured to receive programming instructions and input data, and to process the data according to the programming instructions. The processor 62 is coupled to a plurality of external devices, including a pointing device 66 operable to provide input commands to the processor 62, a keyboard 68 for the entry of text information and commands to the processor 62, a viewing screen 70 for viewing information generated by the processor 62. Other external devices may include a printer 72 operable to generate a printed copy of information generated by the processor 62, a communications port 74 that may be coupled to other processors and/or input and output devices through a communications network. An input-output (I/O) device 76 is configured to receive a removable data storage medium, such as a magnetic disk, an optical disk, a tape device or other similar input/output devices is also coupled to the processor 62. The data record 60 may be transferred to the processor 62, and information generated by the processor 62 may be transferred to the aircraft by means of a removable storage medium or a communications port 74. The processor 62 is operable to receive the one or more data records 60 and to progressively merge the records 60 into a continuous communications switching model that permits an aircraft that navigates along a prescribed route to select and communicate with ground stations along the route. Accordingly, the system 70 further includes a database 78 to store the one or more data records 60.

With reference still to FIG. 5, the operation of the system 70 will now be described. The data record 60 is downloaded to the system 70 by transferring the record 60 from the communications processor 12 of FIG. 1 onto a removable memory device. Alternately, the data record 60 may be downloaded to the system 70 by establishing a wireless communications link between the communications system 10 (FIG. 1) and the system 70 to wirelessly transfer the data record 60 to the system 70. In either case, the data record 60 may be processed by the system 70 so that the data record 60 is merged with other data records obtained from other aircraft that are configured with the system 10 to generate a communications switching model. Accordingly, the communications switching model may include data pertaining to a selected route, or it may include data that extends over a substantial area that includes the selected route. In other embodiments, the model may extend over an entire region, or may even extend world-wide. Consequently, the communications switching model generally comprises a three-dimensional communications model having a plurality of discrete volumes, where each defines an address of a ground station that may be used to communicate with the aircraft. The several of the discrete volumes may overlap. Thus, as the aircraft moves from a first volume to a second adjacent volume, radio communication with a ground station located in the first volume is discontinued, and communications with a ground station located in the second volume are commenced.

Upon the submission of a suitable request to the processor 62 through at least one of the external devices 64, the communications switching model, or any portion, may be uploaded to the aircraft system 10 (FIG. 1) through the database loader 20. The switching model may be transferred from the system 70 to the database loader 20 by means of a removable memory device, or directly by means of the communications port 74 of the system 70, so that the requested data is transferred wirelessly.

FIG. 6 is a table that shows a portion of a communications switching model 80 generated by the system 70 of FIG. 5. The model 80 is generated by the processor 62 from the data record 60 of FIG. 4. The model 80 continuously specifies a plurality of discrete volumes where each defines an address of a ground station for aircraft positions and altitudes along the selected route. In the interest of brevity and clarity of illustration, the table shown in FIG. 6 is applicable for a planned flight along a particular route. It is understood that while the aircraft is navigating along the route, if the aircraft deviates from a position and/or altitude in the table, other applicable portions of the communications switching model 80 are employed to accommodate the deviation. For example, with reference to the table shown in FIG. 6, at the position 45.80N and 118.92W, the switching model indicates that the can expect to hear ground station 34 and 44. Logic within the CMU 22 may select the preferred ground station based on various criteria such as projected flight trajectory and data communication channel congestion.

With continued reference to FIG. 6, the CMU 22, using the model 80 data, determines that it should hand-over at position 52 (as shown in FIG. 3) occurring at a position 46.10N and 119.40W and a flight altitude of 9,000 feet, whereupon the aircraft discontinues communicating with the ground station 32, and begins communicating with ground station 34. The handover position 54 (also shown in FIG. 3) that occurs 45.70N and 116.81W and at 11,000 feet because even though the ground station 34 signal strength is still acceptable; the model 80 data indicates that communication with ground station 34 will not be possible for much longer. The aircraft begins communicating with the ground station 44, and discontinues communicating with the ground station 34 before the communication is interrupted. Similarly, another handover position occurs at 46.50N and 114.80W, whereupon the aircraft switches from the ground station 44 to the ground station 42.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

The invention claimed is:

1. An adaptive communications system for an aircraft, the system comprising:
a position sensing device onboard the aircraft configured to determine a position and a flight altitude for the aircraft;
a communications processor onboard the aircraft configured to select a ground communications station based upon the flight position and altitude of the aircraft;
a previously defined communications switching model that is accessible by the communications processor and configured to indicate the ground station to be selected based upon the position and altitude, the communications switching model comprising a three-dimensional model defining a plurality of discrete volumes of air space, with each volume defining an address of the ground station to be selected, the three-dimensional model including information that indicates which ground station is expected to be available based upon the position and altitude of the aircraft and prior experience of other aircraft; and
a communication management unit coupled to and separate from the communications processor, the communications management unit operable to select a desired communications device onboard the aircraft.

2. The adaptive communications system of claim 1, wherein the communication management unit is further coupled to a flight management computer system.

3. The adaptive communications system of claim 2, wherein the communications management unit is further coupled to at least one multiple control display unit.

4. The adaptive communications system of claim 1, wherein the communications processor is further configured to record communications data including one or more signal strengths from ground stations within a radio range of the aircraft and at least one of a position and an altitude of the aircraft.

5. The adaptive communications system of claim 1, wherein the communications processor is further coupled to a database loader configured to receive the communications model.

6. The adaptive communications system of claim 4, further comprising an external processor configured to receive the communications data and to process the data to compile the communications switching model.

7. The adaptive communications system of claim 6, wherein the external processor is further configured to combine the communications data with other data stored in a database coupled to the processor.

8. A method of communication between an aircraft and a ground station, comprising:
providing a position sensing device onboard the aircraft;
receiving a communications switching model that identifies the ground station based upon a selected flight parameter, the communications switching model comprising a three-dimensional model defining a plurality of discrete volumes of air space, with each volume defining an address of the ground station, the three-dimensional model including information that indicates which ground station is expected to be available based upon a position and altitude of the aircraft and prior experience of other aircraft;
determining a flight parameter for the aircraft from the position sensing device as the aircraft navigates along a flight route;
accessing the communications switching model to select a ground station based upon the determined flight parameter; and
communicating with the selected ground station;
wherein determining a flight parameter for the aircraft farther comprises determining at least a flight altitude and a flight position for the aircraft as it navigates along a prescribed route.

9. The method of claim 8, wherein receiving a communications switching model further comprises providing a VHF frequency corresponding to the selected ground station.

10. The method of claim 8, wherein determining at least a flight altitude and a flight position farther comprises sensing a flight altitude from a pitot-static system positioned on the aircraft, and receiving aircraft positional data from a global positioning system (GPS) positioned on the aircraft.

11. The method of claim 8, wherein accessing the communications switching model further comprises providing at least an altitude and a flight position of the aircraft, and selecting a frequency of a ground station based upon the altitude and the flight position of the aircraft.

12. The method of claim 8, wherein accessing the communications switching model further comprises accessing a memory device that contains the communications switching model.

13. The method of claim 8, wherein communicating with the selected ground station further comprises discontinuing communications with a first ground station and initiating communications with a second ground station when the aircraft is proximate to a hand-over point.

14. A method for generating a communications switching model, comprising:
   providing a position sensing device onboard an aircraft;
   receiving signals from at least one ground station within a radio range of the aircraft;
   measuring a signal strength of the signals from the ground station;
   determining an altitude of the aircraft from the position sensing device when the signal strength is measured;
   determining a geographical location of the aircraft from the position sensing device when the signal strength is measured; and
   defining a geographical hand-over point based upon the measured signal strength and the altitude;
   wherein defining a hand-over point based upon the measured signal strength further comprises processing the measured signal strength and the corresponding altitude and geographical location to identify the hand-over point;
   wherein the communications switching model comprises a three-dimensional model defining a plurality of discrete volumes of air space, with each volume defining an address of the ground station to be selected, the three-dimensional model including information that indicates which ground station is expected to be available based upon the location and altitude of the aircraft and prior experience of other aircraft.

15. The method of claim 14, wherein determining an altitude of the aircraft further comprises receiving an altitude measurement from one of a pitot-static system and an air-data computer operably coupled to the aircraft.

16. The method of claim 14, wherein determining a geographical location further comprises receiving the geographical position from one of a global positioning system (GPS) and an inertial navigation system (INS) operably coupled to the aircraft.

17. The method of claim 14, wherein determining an altitude of the aircraft further comprises periodically determining the altitude.

18. The method of claim 14, wherein determining a geographical location further comprises periodically determining the geographical location.

19. The method of claim 14, further comprising storing the measured signal strength and the corresponding altitude and geographical location in a memory device.

20. The method of claim 14, wherein processing the measured signal strength and the corresponding altitude and geographical location further comprises processing a data record compiled while the aircraft is navigating along a route, and further comprising combining the processed data record with other processed data records obtained from one or more aircraft that previously navigated along the route.

21. A method for recording communications data for an aircraft, comprising:
   providing a position sensing device onboard the aircraft;
   measuring at least one signal strength value for signals received from a ground station within a radio range of the aircraft;
   determining a position of the aircraft from the position sensing device corresponding to the measured signal strength;
   determining an altitude of the aircraft from the position sensing device corresponding to the measured signal strength;
   selecting a ground station based on the measured signal strength, determined position, and determined altitude by accessing a communications switching model that identifies the ground station based upon a selected flight parameter, the communications switching model comprising a three-dimensional model defining a plurality of discrete volumes of air space, with each volume defining an address of the ground station, the three-dimensional model including information that indicates which ground station is expected to be available based upon the position and altitude of the aircraft and prior experience of other aircraft; and
   compiling a data record that includes at least the measured signal strength, a ground station identity, the aircraft altitude, and the aircraft position.

22. The method of claim 21, wherein determining a position of the aircraft farther comprises estimating a geographical position of the aircraft using at least one of a global positioning system (GPS) and an inertial navigation system (INS).

23. The method of claim 21, wherein determining a position of the aircraft further comprises measuring an elapsed flight time.

24. The method of claim 21, wherein determining a position of the aircraft further comprises measuring a latitude and a longitude corresponding to the position of the aircraft.

25. The method of claim 21, wherein measuring at least one signal strength value received from a ground station further comprises measuring a signal strength value while the aircraft is positioned on the ground.

26. The method of claim 21, wherein measuring at least one signal strength value received from a ground station further comprises measuring a signal strength value while the aircraft is navigating along a flight route.

27. A communications system for an aircraft, comprising:
   a position sensing device onboard the aircraft operable to determine a flight position and a flight altitude for the aircraft; and
   a communications processor coupled to a memory device and onboard the aircraft, the processor being operable to select a ground station based upon a predetermined communications switching model stored within the memory device, and being further operable to acquire selected communications data, the communications data comprising a ground station signal strength measurement, the position determination of the aircraft and the aircraft altitude determination;
   wherein the communications processor is further configured to record communications data including one or more signal strengths from ground stations within a radio range of the aircraft and at least one of the position and the altitude of the aircraft;
   wherein the communications switching model comprises a three-dimensional model defining a plurality of discrete volumes of air space, with each volume defining an address of the ground station to be selected, the three-dimensional model including information that indicates which ground station is expected to be available based upon the position and altitude of the aircraft and prior experience of other aircraft.

28. The system of claim 27, wherein the position sensing device further comprises at least one of a global positioning system (GPS) and an inertial navigation system (INS).

29. The system of claim 27, wherein the position sensing device further comprises at least one of a pitot-static system and an air data computer coupled to the aircraft.

30. The system of claim 27, wherein the communications processor is further configured to transfer the communications data to an external processor.

31. The system of claim 30, wherein the external processor is further configured to process the communications data and compile the communications switching model.

32. The system of claim 30, wherein the external processor is further configured to transfer the communications switching model to the communications processor.

33. The system of claim 32, wherein the external processor is configured to wirelessly transfer the communications switching model to the communications processor.

34. The system of claim 32, wherein the external processor is configured to receive a portable memory device that contains the communications data.

* * * * *